United States Patent Office 3,389,172
Patented June 18, 1968

3,389,172
SULFONIC ACIDS OF N,N-BIS(PHENYLALKYL) DIAMINES
Harold George Burrows, Frederick Keith Duxbury, and Philip Brierley Ingham, Manchester, England, assignors to Imperial Chemical Industries Limited, London, England, a corporation of Great Britain
No Drawing. Filed Jan. 30, 1967, Ser. No. 612,311
Claims priority, application Great Britain, Feb. 10, 1966, 5,898/66
2 Claims. (Cl. 260—510)

ABSTRACT OF THE DISCLOSURE

Sulphonic acids of N,N - bis(phenylalkyl)alkylenediamines, and metal salts thereof, and the incorporation of such compounds into polyamides for improving the affinity of polyamides for basic dyestuffs.

This invention relates to new organic compounds, and more particularly it relates to certain sulphonated diamines which are valuable in the production of fibre-forming polyamides.

According to the invention there are provided the organic compounds of the formula $$\begin{array}{c} HN\text{---}R\text{---}NH \\ | \quad\quad\quad | \\ (CH_2)_n \quad (CH_2)_m \\ | \quad\quad\quad | \\ R^1 \quad\quad R^2 \\ | \quad\quad\quad | \\ (SO_3M)_x \quad (SO_3M)_y \end{array}$$

wherein R represents an alkylene radical of from 2 to 12 carbon atoms, a cycloalkylene radical or a group of the formula

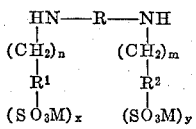

$R^1$ and $R^2$ each independently represent an aromatic nucleus, M represents a hydrogen or a metal atom, $n$ and $m$ each independently represent integers of from 1 to 6, and $x$, $y$ and $z$ each independently represent 0, 1 and 2 provided that the sum of $x$, $y$ and $z$ is at least 1.

As examples of the alkylene radicals represented by R there may be mentioned trimethylene, tetramethylene, hexamethylene, octamethylene, decamethylene and dodecamethylene radicals. As examples of the cycloalkylene radicals represented by R there may be mentioned 1,4-cyclohexylene, 1,3 - cyclohexylene, 1,3 - bis(methylene)-cyclohexane and 1,4-bis(methylene)cyclohexane radicals.

It is preferred that the methylene groups which are present in the groups of the formula

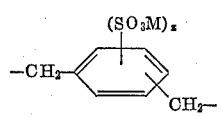

are in m- or p-position to one another.

The metal atoms represented by M are preferably alkali metal atoms such as sodium and potassium atoms. When M represents a hydrogen atom then it is also possible that the said compounds exist in the form of an internal salt.

As examples of the aromatic nuclei represented by $R^1$ and $R^2$ there may be mentioned diphenylene, diphenylmethane, fluorene, and preferably naphthalene and, in particular, benzene nuclei.

According to a further feature of the invention there is provided a process for the manufacture of the organic compounds of the invention which comprises sulphonating a compound of the formula

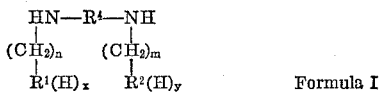

Formula I wherein $R^1$, $R^2$, $n$, $m$, $x$ and $y$ have the meanings stated, and $R^4$ represents an alkylene radical of from 2 to 12 carbon atoms, a cycloalkylene radical or a group of the formula

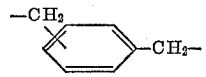

and if desired converting the resulting sulphonic acid to a metal salt thereof.

The process of the invention can be conveniently carried out by any of the methods known for sulphonating organic compounds containing aromatic residues; for example by treating the compound with concentrated sulphuric acid or sulphuric acid containing free sulphur trioxide. The resulting sulphonic acids can then be isolated by conventional methods, for example, by pouring the sulphonation mixture into a mixture of ice and water and filtering off the sulphonic acid, or the internal salts thereof, which is precipitated.

The free sulphonic acids can then be converted to the metal salts by adding an equivalent amount of the hydroxide of the metal to an aqueous suspension of the sulphonic acid, and concentrating the resulting solution until the metal salt crystallises out.

The compounds of Formula I used in the process of the invention can themselves be obtained by condensation of a diamine of the formula $H_2N\text{---}R^4\text{---}NH_2$ with one or two different aldehydes of the formula $$(H)_xR^1\text{---}(CH_2)_{n-1}CHO$$

and subsequent reduction of the ---CH=N--- groups.

As specific examples of compounds of Formula I which can be used in the process of the invention there may be mentioned N,N'-di(benzyl)hexamethylenediamine, N,N'-di(benzyl)-m-xylylenediamine, N,N'-di(benzyl)-p-xylylenediamine, N,N'-bis(β-naphthylmethyl)hexamethylenediamine, N,N'-bis(β-naphthylmethyl)-m-xylylenediamine and N,N'-bis(β-naphthylmethyl)-p-xylylenediamine.

One preferred class of the organic compounds of the invention comprises organic compounds of the formula

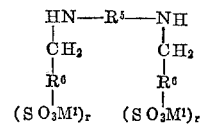

wherein $R^5$ represents an alkylene radical containing from 2 to 12 carbon atoms, preferably 6 carbon atoms, $R^6$ represents a naphthylene or, above all, a phenylene radical, $M^1$ represents a hydrogen, sodium or potassium atom, and $r$ represents 1 or 2.

A second preferred class of the organic compounds of the invention comprises the organic compounds of the formula

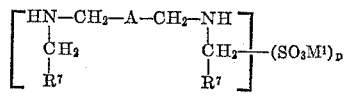

wherein A is a 1,3- or 1,4-phenylene radical, $R^7$ represents a naphthyl or, preferably, a phenyl radical, $M^1$ represents a hydrogen, sodium or potassium atom, and $p$ is an integer of from 1 to 6.

The organic compounds of the invention are particularly valuable when used as intermediates in the manufacture of fibre-forming polyamides, since polyamides containing minor proportions of the said compounds have reduced affinity for acid dyestuffs and an increased affinity for basic dyestuffs, and such polyamides form a further feature of the invention.

According to a further feature of the invention there are provided polyamides, having an increased affinity for basic dyestuffs and a reduced affinity for acid dyestuffs, which comprises polymerising a monoaminomonocarboxylic acid or an internal lactam thereof having at least two carbon atoms between the amino and carboxylic acid groups, or substantially equimolecular proportions of a diamine which contains at least two carbon atoms between the amino groups and a dicarboxylic acid which contains at least two carbon atoms between the carboxylic acid groups, in the presence of a small amount of an organic compound of the formula

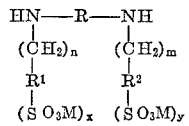

wherein R, $R^1$, $R^2$, M, $m$, $n$, $x$ and $y$ have the meanings stated.

This process can be carried out under the conditions normally employed for polymerising a polymerisable monoamino-monocarboxylic acid, or a lactam thereof, or for polymerising a mixture of a diamine and a dicarboxylic acid, the said organic compound being added at any stage of the polymerisation process. It is however preferred to add the said organic compound during the initial stages of the polymerisation, and, above all, at the stage of charging the reactants to the polymerisation vessel.

When starting from a substantially equimolecular proportion of a diamine and a dicarboxylic acid the said compounds can be used in the form of a salt of each other; thus, for example, hexamethylene diammonium adipate can be used instead of a mixture of equimolecular proportions of adipic acid and hexamethylenediamine.

The process of the invention is preferably carried out at a temperature between 200° and 350° C., until the required degree of polymerisation is obtained.

The said organic compounds are preferably used in the form of the sodium or potassium salts, that is the compounds wherein M represents a sodium or potassium atom; and as specific examples of the said organic compounds which can be used to obtain the polyamides there may be mentioned the disodium or potassium salt of N,N'-di(sulphobenzyl)hexamethylenediamine, the disodium salt of N,N'-di(sulphobenzyl)-m-xylylenediamine and the disodium salt of N,N'-di(sulphobenzyl)-p-xylylenediamine.

The amount of the said organic compound which is added to the polymerisation mixture is preferably between 0.2 and 6 molar percent based on the molecular weight of the components which are being polymerised.

As examples of the said polymerisable monoamino-monocarboxylic acids, or lactams thereof, there may be mentioned ε-aminocaproic acid, caprolactam, 9-aminononanoic acid, 1-aminoundecanoic acid, 17-aminoheptadecanoic acid and enantholactam.

As examples of the said diamines there may be mentioned diamines of the general formula $H_2H(CH_2)_pNH_2$ wherein $p$ is an integer of from 2 to 8, such as trimethylenediamine, tetramethylenediamine, pentamethylenediamine, octamethylenediamine and, above all, hexamethylenediamine.

As examples of the said dicarboxylic acids there may be mentioned isophthalic and terephthalic acids but preferably the dicarboxylic acids of the formula

HOOC·Y·COOH wherein Y is a divalent aliphatic radical containing at least 2 carbon atoms, and as examples of such acids there may be mentioned sebacic acid, octadecanedioic acid, suberic acid, azelaic acid, undecanedioic acid, glutaric acid, pimelic acid and, above all, adipic acid.

If desired other ingredients, such as delustrants, light stabilisers, heat stabilisers and molecular weight regulators, which are commonly present in fibre-forming polyamides can be added before, during or at the end of the polymerisation stage of the present invention.

The polyamides produced by the process of the invention can be converted into fibres by any of the conventional methods of producing fibres from polymers, for example, by melt spinning. The resulting fibres have excellent affinity for basic dyestuffs and this affinity is much greater than that of fibres prepared from the corresponding polymers which were prepared in the absence of the said organic compounds.

The invention is illustrated, but not limited, by the following examples in which the parts and percentages are by weight:

EXAMPLE 1

10 parts of N,N'-di(benzyl)-hexamethylenediamine dihydrochloride are stirred with 10 parts of sulphuric acid until evolution of hydrogen chloride ceases. 12.7 parts of 65% oleum are then gradually added during 15 minutes, and the mixture is then stirred for 1 hour at 95° to 100° C. The mixture is then cooled to 0° C., poured onto 100 parts of ice, and the precipitated solid is filtered off, washed with water and dried.

On analysis the product is found to contain 49.2% of carbon, 5.0% of hydrogen, 5.4% of nitrogen and 13.5% of sulphur which corresponds to a N,N'-di(sulphobenzyl) hexamethylenediamine.

EXAMPLE 2

131 parts of hexamethylenediammonium adipate, 2.47 parts of the disodium salt of N,N'-di(sulphobenzyl)hexamethylenediamine, 0.73 part of adipic acid and 40 parts of water are charged to a stainless steel autoclave, which is then heated to 100° C. The autoclave is purged with steam, then closed, and heating is continued until a pressure of 250 pounds per sq. in. and a temperature of 220° C. is obtained. Heating is then continued until a temperature of 240° C. is obtained whilst the pressure is maintained at 250 pounds per sq. in. by a slow release of steam from the autoclave. The pressure in the autoclave is then slowly reduced to atmospheric pressure while the temperature is raised to 270° C. After 65 minutes at this temperature the polymer is discharged from the autoclave and converted by melt-spinning into fibres.

The resulting fibres have excellent affinity for basic dyestuffs (such as are described on pages 1617 to 1653 of the second edition of the Colour Index) when applied from an aqueous dyebath, and this affinity is much higher than that of fibres obtained from a polymer which was prepared as described above except that the 2.47 parts of the disodium salt of N,N'-di(sulphobenzyl)hexamethylenediamine and 0.73 part of adipic acid were omitted from the autoclave.

EXAMPLE 3

A mixture of 10 parts of N,N'-di(benzyl)ethylenediamine dihydrochloride and 46 parts of sulphuric acid is stirred at 20° C. until evolution of hydrogen chloride ceases, and the mixture is then heated for 16 hours at 95° to 100° C. The mixture is cooled to 30° C., poured into 200 parts of ethyl acetate, and the precipitated solid is filtered off, washed with ethyl acetate, and dried.

On analysis the product is found to contain 5.5% of nitrogen and 11.5% of sulphur, which corresponds to a mixture of mono- and di-sulphonated N,N'-di(benzyl) ethylenediamine.

EXAMPLE 4

In place of the 2.47 parts of the disodium salt of the sulphonic acid and the 0.73 part of adipic acid used in Example 2 there are used respectively 2.98 parts of the sodium salt of the compound of Example 3 and 0.973 part of adipic acid. Fibres prepared from the resulting polyamide have excellent affinity for basic dyestuffs.

EXAMPLE 5

The procedure of Example 2 is repeated except that 2.26 parts of titanium dioxide are also charged to the autoclave. Fibres prepared from the resulting delustred polyamide have excellent affinity for basic dyestuffs.

EXAMPLE 6

A mixture of 10 parts of N,N'-di(benzyl)hexamethylenediamine hydrochloride and 27.6 parts of sulphuric acid is stirred at 20° C. until evolution of hydrogen chloride ceases. 24.5 parts of 65% oleum are added, and the mixture is stirred for 5 hours at 150° C. The mixture is then cooled to 30° C., poured into 100 parts of ethyl acetate, and the precipitated solid is filtered off, washed with ethyl acetate, and dried.

On analysis the product is found to contain 39.2% of carbon, 4.6% of nitrogen and 18.7% of sulphur, which corresponds to a tetrasulphonated N,N'-di(benzyl)hexamethylenediamine.

EXAMPLE 7

A mixture of 131 parts of hexamethylene diammonium adipate, 1.93 parts of the dipotassium salt of the tetrasulphonated N,N'-di(benzyl)hexamethylenediamine of Example 6, 0.365 part of adipic acid and 40 parts of water is polymerised by the method described in Example 2.

Fibres prepared from this polyamide have excellent affinity for basic dyestuffs.

EXAMPLE 8

A mixture of 10 parts of N,N'-di(benzyl)-m-xylylenediamine and 27.6 parts of sulphuric acid is stirred at 30° C. until evolution of hydrogen chloride ceases, and then for 5 hours at 150° C. The mixture is cooled to 20° C., poured into 100 parts of ethyl acetate, and the precipitated solid is filtered off, washed with ethyl acetate and dried.

On analysis the product is found to contain 52.3% of carbon, 5.3% of hydrogen, 5.6% of nitrogen and 12.6% of sulphur, which corresponds to a disulphonic acid of N,N'-di(benzyl)-m-xylylenediamine.

EXAMPLE 9

A mixture of 131 parts of hexamethylene diammonium adipate, 2.66 parts of the disodium salt of the disulphonic acid of N,N'-di(benzyl)-m-xylylenediamine of Example 8, 0.73 part of adipic acid and 40 parts of water is polymerised by the method described in Example 2.

Fibres prepared from this polyamide have excellent affinity for basic dyestuffs.

EXAMPLE 10

A mixture of 10 parts of N,N'-di($\gamma$-phenyl-n-propyl) hexamethylene dihydrochloride and 27.6 parts of sulphuric acid is stirred at 20° C. until evolution of hydrogen chloride ceases. 24.5 parts of 65% oleum are then added and the water stirred for 1½ hours at 100° C. The mixture is then cooled to 20° C., poured into 100 parts of ethyl acetate, and the precipitated solid is filtered off, washed with ethyl acetate and dried.

On analysis the product is found to contain 46.2% of carbon, 3.5% of nitrogen and 17.8% of sulphur, which corresponds to a tetra sulphonic acid of N,N'-di($\gamma$-phenyl-n-propyl)hexamethylenediamine.

EXAMPLE 11

A mixture of 131 parts of hexamethylene diammonium adipate, 1.88 parts of the tetra sodium salt of the sulphonic acid of Example 10, 0.36 part of adipic acid and 40 parts of water is polymerised by the method described in Example 2.

Fibres prepared from this polyamide have excellent affinity for basic dyestuffs.

We claim:

1. Organic compounds of the formula

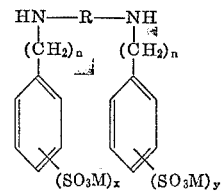

wherein R is selected from the class consisting of an alkylene radical of from 2 to 12 carbon atoms and a group of the formula

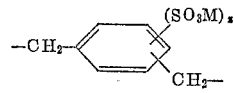

M is selected from the class consisting of hydrogen, sodium and potassium, $n$ is an integer of from 1 to 6, and $x$, $y$ and $z$ each represent a number of from 0 to 2 provided that their sum is at least one.

2. Organic compounds, as claimed in claim 1, which are of the formula

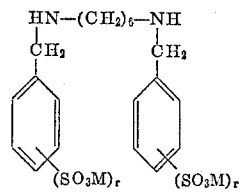

wherein M is selected from the class consisting of hydrogen, sodium and potassium, and $r$ is a positive integer not exceeding 2.

References Cited

UNITED STATES PATENTS 3,075,066   1/1963   Todd et al.

DANIEL D. HORWITZ, *Primary Examiner.*